United States Patent [19]

Hanchett et al.

[11] Patent Number: 4,590,680
[45] Date of Patent: May 27, 1986

[54] ELECTRONIC INCLINATION SENSING DEVICE

[75] Inventors: Michael T. Hanchett, Edmonds; Patrick B. Stone; Kurt W. Bujack, both of Lynnwood; Monte S. Strand, Seattle, all of Wash.

[73] Assignee: Technical Designs Incorporated, Edmonds, Wash.

[21] Appl. No.: 620,035

[22] Filed: Jun. 13, 1984

[51] Int. Cl.$^4$ ............................................. G01C 9/10
[52] U.S. Cl. ................................................... 33/366
[58] Field of Search ........................................ 33/366

[56] References Cited

U.S. PATENT DOCUMENTS

| | | | |
|---|---|---|---|
| 2,910,782 | 11/1959 | Krantz | 33/366 |
| 3,357,259 | 12/1967 | Hansen | 73/484 |
| 3,371,424 | 3/1968 | Sweet | 33/206 |
| 3,512,852 | 5/1970 | North | 308/10 |
| 3,584,387 | 6/1971 | Sturm | 33/366 |
| 3,863,067 | 1/1975 | Gooley | 250/231 |
| 4,025,193 | 5/1977 | Pond et al. | 356/5 |
| 4,110,609 | 8/1978 | Beer | 250/231 |
| 4,182,046 | 1/1980 | Ludlow et al. | 33/366 |

Primary Examiner—Robert I. Smith
Attorney, Agent, or Firm—Christensen, O'Connor, Johnson & Kindness

[57] ABSTRACT

A device is disclosed for sensing information relating to the orientation of a selected direction or plane with respect to the horizontal. In one embodiment, the invention comprises a housing (40), a vial (70) mounting in the housing, a source of electromagnetic radiation (62, 64), sensors (66, 68) and associated electronic circuitry, and a rail (12) for positioning the housing. The vial is elongated along a central longitudinal axis and is partially filled with liquid (72) to form a bubble (74) in the vial. The source of radiation is positioned in a housing plane to one side of the vial such that radiation passes through the vial and forms a shadow of the bubble on the other side of the vial. The shadow is detected by the sensors, and the associated electronic circuitry produces an output signal having a characteristic related to the bubble position along the longitudinal axis. The rail is adapted to position the housing with respect to a selected direction such that the housing is vertical and the orientation of the longitudinal axis of the vial with respect to the selected direction is known. The electronic circuitry is preferably adapted to produce an output signal corresponding to the difference between the signals provided by the sensors. A further embodiment is disclosed that is capable of sensing information relating to the orientation of a selected plane. In such further embodiment, the bubble (230) is contained in a chamber (226) beneath an inwardly concave upper wall (228), and the shadow (240) of the bubble is projected onto a two-dimensional sensor array (234).

29 Claims, 8 Drawing Figures

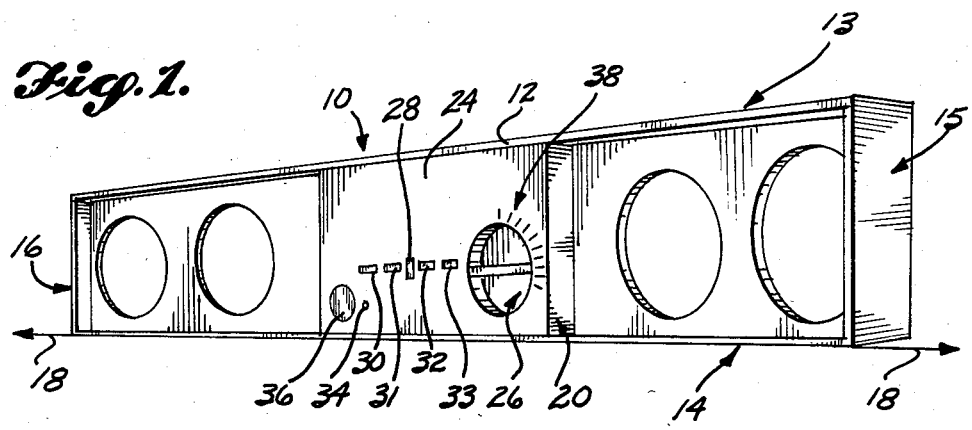
Fig. 1.
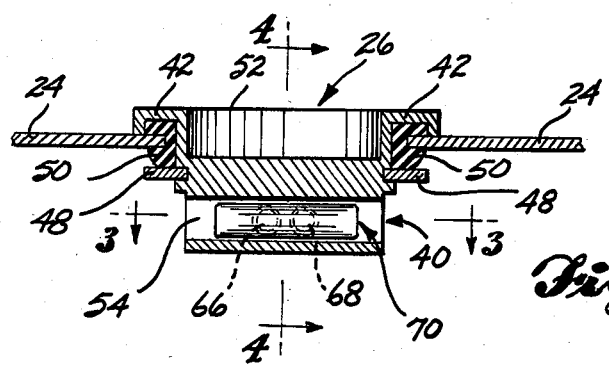
Fig. 2.
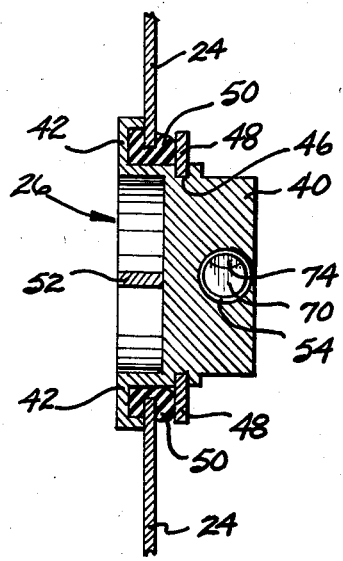
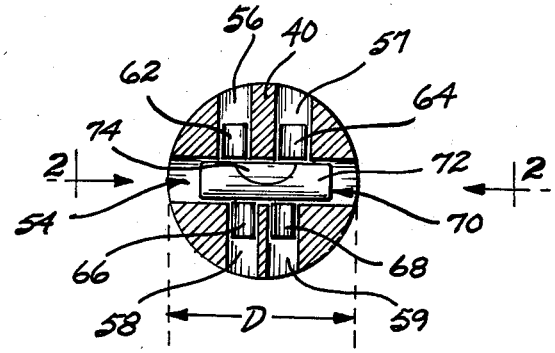
Fig. 3.
Fig. 4.

ELECTRONIC INCLINATION SENSING DEVICE

FIELD OF THE INVENTION

The present invention relates to devices for sensing inclination, and in particular to electronic devices for sensing orientation with respect to the horizontal.

BACKGROUND OF THE INVENTION

A conventional mechanical construction level includes a vial partially filled with liquid so as to form an air or gas bubble in the vial. The vial is mounted in an elongated rail that is adapted to be positioned adjacent to and aligned with a surface whose orientation is to be sensed. The vial includes index marks positioned such that when the bubble is centered between the index marks, the rail is horizontal.

A number of efforts have been made to produce electronic leveling devices that are generally similar to mechanical levels but that use electrical and optical means to determine that the bubble is centered. In one prior arrangement, the vial has a rectangular cross section, and the bubble position is sensed by a pair of LED-phototransistor combinations positioned such that light from an LED reaches its associated phototransistor by passing horizontally and transversely through the upper portion of the vial. In such a device, light passes either through the bubble or through the liquid, depending upon the bubble position. By comparing the output of each phototransistor to a predetermined reference level, a determination is made as to whether or not the bubble is centered and the device is horizontal.

Although electronic level sensing devices possess a number of advantages when compared to conventional mechanical levels, prior electronic leveling devices have not achieved their full potential. Perhaps the principal limitation of most prior electronic devices is that they detect only the longitudinal ends of the bubble, and therefore do not provide an indication of the degree of deviation of the device from the horizontal. Some prior devices do not even indicate the direction of deviation. Prior devices have also typically made use of comparatively inefficient electronic circuits, which has resulted in excessive weight, bulk and power consumption. Certain prior devices have also used temperature sensitive circuits, and the accuracy of these devices has therefore been limited.

SUMMARY OF THE INVENTION

The present invention provides a device that is capable of sensing information relating the orientation of a selected direction or plane with respect to the horizontal. In a preferred embodiment, the invention comprises a housing, a chamber mounted in the housing, a source of electromagnetic radiation, sensor means, and means for positioning the housing. The chamber includes an upper wall, and the chamber is partly filled with liquid so as to form a bubble in the chamber. The upper wall is shaped so as to permit the bubble to move with respect to the upper wall when the orientation of the upper wall with respect to the horizontal is changed. The source of radiation is positioned on a first side of the chamber and is adapted to direct at least some of the radiation in a substantially vertical direction through the chamber to form a shadow of the bubble on a second, opposite side of the chamber. The shadow of the bubble is detected by the sensor means, the sensor means comprising at least two detectors and being adapted to produce an output signal having a characteristic related to the position of the bubble with respect to the upper wall. The positioning means positions the housing with respect to a selected direction, such that the orientation of the upper wall with respect to the selected direction is known.

In a second embodiment, the present invention comprises a housing, a vial mounted in the housing, a source of electromagnetic radiation, sensor means, and means for positioning the housing. The vial is elongated along a central longitudinal axis and is partially filled with liquid so as to form a bubble in the vial. The source of radiation is positioned on one side of the vial such that the source of radiation and the longitudinal axis define a housing plane, and such that at least some of the radiation passes through the vial. The radiation therefore forms a shadow of the bubble on the other side of the vial. The shadow is detected by sensor means which produces an output signal having a characteristic related to the bubble position along the longitudinal axis. The sensor means comprises first and second detectors located at spaced apart positions approximately in the housing plane along a side of the vial opposite from the source of radiation. The positioning means is adapted to position the housing with respect to the selected direction such that the housing plane is approximately vertical and such that the orientation of the longitudinal axis with respect to the selected direction is known.

In a further aspect of the invention, the first and second detectors are adapted to produce respective first and second signals corresponding to the intensity of radiation at the respective detectors, and the sensor means further comprises difference means responsive to the first and second signals to produce an output signal corresponding to the difference between the first and second signals. The device may further comprise display means responsive to the output signal for indicating whether or not the longitudinal axis is horizontal and, if it is not horizontal, for indicating the direction and degree of the deviation from the horizontal.

In a further aspect of the present invention, the output signal is linearly related to the bubble position along the longitudinal axis over a range of orientations of the longitudinal axis that includes horizontal.

In a further aspect of the present invention, the source of electromagnetic radiation comprises two light emitting diodes that are positioned abutting one side of the vial at spaced apart locations along the longitudinal axis. Each light emitting diode may be positioned directly across the vial in a transverse direction from one of the detectors. The distance between the center points of the light emitting surfaces of the light emitting diodes are preferably spaced apart by a distance equal to the length of the bubble along the longitudinal axis when the longitudinal axis is approximately horizontal.

In another embodiment of the present invention, a device is provided that is capable of sensing information relating to the orientation of a selected plane with respect to the horizontal. The device comprises a housing, a chamber mounted in the housing, a source of electromagnetic radiation, sensor means and positioning means. The chamber includes an upper wall that has a concave shape as viewed from the interior of the chamber. The chamber is partially filled with liquid so as to form a bubble in the chamber, the bubble size being adjusted such that the radius of curvature of the upper wall is substantially greater than the diameter of the bubble. The source of radiation is positioned outside the chamber along a chamber axis normal to the upper wall of the chamber at an interior point of such wall, the plane tangent to the chamber at the interior point defining a reference plane. The source of radiation is adapted to direct at least some of the radiation through a portion of the chamber containing the bubble to thereby form a shadow of the bubble on the other side of the chamber. The sensor means comprises a two-dimensional array of detectors disposed substantially parallel to the reference plane on the side of the chamber opposite from the source of radiation. The sensor means detects the shadow of the bubble caused by the radiation passing through the chamber and produces output signals having characteristics related to the bubble position in the reference plane. The positioning means positions the housing with respect to the selected plane such that the orientation of the reference plane with respect to the selected plane is known.

These and other features of the invention will become apparent in the detailed description and claims to follow, taken in conjunction with the accompanying drawings.

BRIEF DESCRIPTION OF THE DRAWINGS

FIG. 1 is a perspective view of an electronic construction level according to the present invention.

FIG. 2 is a top cross-sectional view of the vial assembly of the construction level of FIG. 1.

FIG. 3 is a cross-sectional view taken along line 3—3 of FIG. 2.

FIG. 4 is a cross-sectional view taken along line 4—4 of FIG. 2.

DETAILED DESCRIPTION OF THE INVENTION

Figure 5:
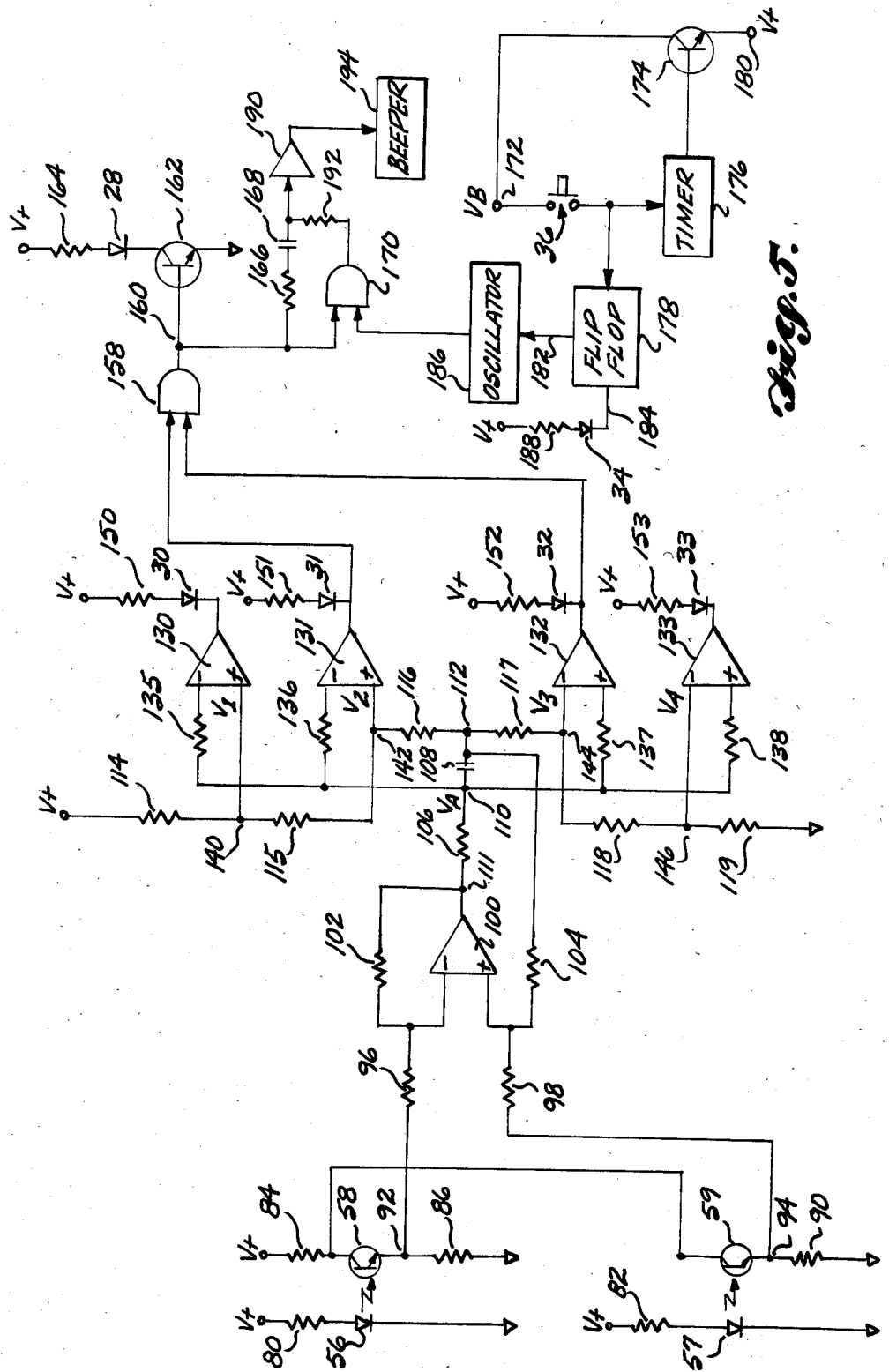
FIG. 5 is a diagram of a circuit suitable for use in the construction level of FIG. 1.

Referring initially to FIG. 1, a preferred embodiment of the present invention is shown comprising construction level 10. Level 10 includes a conventional rail 12 having upper longitudinal surface 13, lower longitudinal surface 14, and side surfaces 15 and 16. Surfaces 13–16 are rectangular and planar, with upper longitudinal surface 13 being parallel to lower longitudinal surface 14, and side surfaces 15 and 16 being parallel to one another and normal to the longitudinal surfaces. Level 10 also includes instrument panel 20 mounted at an intermediate position along the length of rail 12 between the longitudinal surfaces. Instrument panel 20 includes face plate 24 in which vial assembly 26, green LED 28, red LEDs 30–33, indicator LED 34, and switch 36 are mounted. Face plate 24 also includes scale marks 38, the function of the scale marks being described below.

Reference axis 18 is defined to be coincident with the elongated dimension of lower longitudinal surface 14. Level 10 operates to determine the orientation of reference axis 18 with respect to the horizontal, or with respect to some other preselected inclination. Thus, by positioning level 10 such that the reference axis is coincident with an unknown direction, the orientation of the unknown direction may be determined. The orientation of reference axis 18 is determined using a bubble filled vial, a source of radiation positioned to illuminate the vial such that the bubble casts a shadow, and sensor means to detect the position of the bubble shadow. By sensing the shadow of the bubble, rather than for example the bubble edges, a signal that varies linearly with the orientation of the reference axis can be produced, and the direction and degree of deviation from the horizontal can be determined.

Referring now to FIGS. 2–4, vial assembly 26 is generally cylindrical in shape and is mounted in a circular opening in face plate 24. The vial assembly comprises housing 40 from which circular mounting flange 42 extends. As indicated in FIGS. 2 and 4, bushing 50 is positioned around the forward end of housing 40 adjacent flange 42, and the housing and bushing are held in the circular opening in face plate 24. Retaining ring 48 is positioned in a groove 46 that extends circumferentially around housing 40 a short distance rearwardly from flange 42, such that the retaining ring abuts bushing 50. Vial assembly 26 is thus free to rotate, but cannot be removed axially from the face plate unless the retaining ring is first removed. Rib 52 extends diametrically across the forward end of housing 40, and provides a convenient means for gripping the vial assembly to rotate it to a different orientation.

Housing 40 includes central passageway 54, upper transverse passageways 56 and 57, and lower transverse passageways 58 and 59. The central and transverse passageways are coplanar with one another, and the transverse passageways are normal to central passageway 54. Cylindrical vial 70 is mounted in central passageway 54 with a tight, sliding fit between the vial and the housing, such that the vial will not move with respect to the housing during normal use of the level. The vial is centered in central passageway 54 such that the midpoint of the vial coincides at the midpoint of the central passageway, the midpoint of the central passageway in turn being halfway between upper transverse passageways 56 and 57 and halfway between lower transverse passageways 58 and 59.

LEDs 62 and 64 are mounted in upper, transverse passageways 56 and 57 respectively, such that their light emitting portions face downward and abut vial 70. Phototransistors 66 and 68 are positioned in lower transverse passageways 58 and 59, respectively, such that their photosensitive portions face upward and abut vial 70. Light emitted by LEDs 62 and 64 may therefore pass through vial 70 and be detected by phototransistors 66 and 68. Central passageway 54 has a circular cross section to accommodate cylindrical vial 70. The transverse passageways have whatever cross sections are appropriate to accommodate their respective LEDs and phototransistors.

Vial 70 is partially filled with a liquid 72 so as to form bubble 74 in the vial. Bubble 74 may be made up of air or any other suitable gas. Liquid 72 and vial 70 may comprise any appropriate substances that are at least partially transparent to the radiation emitted by LEDs 62 and 64. Suitable substance for liquid 72 and vial 70 are methanol and soda lime glass respectively. Vial 70 preferably has a slight curvature along its central longitudinal axis such that, as viewed in FIG. 3, the ends of the vial are lower than its center. The purpose of such curvature is to reduce the amount of bubble travel caused by a given change in inclination, to avoid making the device overly sensitive. The amount of liquid 72 in vial 70 is preferably selected such that when the bubble is centered in the vial, the lateral edges of the bubble lie immediately beneath the centers of the light emitting positions of the LEDs. The length of vial 70 is preferably selected such that when the bubble is approximately centered, as indicated in FIG. 3, the width of bubble 74 is greater than one-third of the vial length. By use of such dimensions, the bubble will always be positioned to block at least some of the light from one of the LEDs, and to therefore cast a shadow, regardless of the orientation of the vial. For a vial assembly having a housing diameter (dimension D, FIG. 3) of 1.25 inches, suitable housing and vial dimensions are as follows (dimensions in inches):

Diameter of central passageway—0.22
Diameter of transverse passageways—0.20
Spacing between upper transverse passageway centerlines—0.30
Spacing between lower transverse passageway centerlines—0.176
Vial length—0.61
Vial diameter—0.22
Bubble length—0.22-0.24

In general, the distance between the lower transverse passageways, and therefore between phototransistors 66 and 68, may be varied to suit particular applications. The dimensions in the above Table specify an embodiment suitable for a general purpoe construction level in which the phototransistors abut one another and lower transverse passageways 58 and 59 are merged into a single oval or figure 8 shaped passageway. The phototransistors can also be moved farther apart, to a spacing equal to or greater than the spacing between LEDs 62 and 64.

The operation of the present invention can be illustrated with reference to FIG. 6. FIG. 6 is a simplified, two-dimensional diagram showing a gas bubble 196 immersed in a liquid 198 and trapped beneath a constraining surface 200. Because the index of refraction of the gas bubble is less than the index of refraction of the surrounding liquid, the bubble acts as a diverging lens. As indicated in FIG. 6, parallel radiation 202 incident downward on the optical system comprising bubble 196 and liquid 198 will result in diverging radiation 204. The area beneath bubble 196 will therefore receive less radiation than it would if the bubble were not present, and the bubble will cast a shadow. Referring again to FIG. 3, the device of the present invention operates by detecting the position of such a shadow. As described previously, the dimensions and relative positions of vial 70, bubble 74 and LEDs 62 and 64 are such that the bubble is always positioned to block some of the light from the LEDs that is incident upon the vial. The result is that a bubble shadow will always be present beneath the vial, and phototransistors 66 and 68 are positioned beneath the vial to detect such a shadow. Vial assembly 26 is preferably constructed, as indicated in FIG. 3, such that it it symmetrical about a plane normal to the longitudinal axis of the vial. By means of such a construction, a vial assembly is produced such that when the longitudinal axis of the vial is horizontal, the shadow of the bubble is symmetrical and centered between the phototransistors, and the phototransistors therefore receive equal amounts of radiation. Furthermore, when the longitudinal axis of the vial is inclined, the bubble will shift in position such that the difference in radiation received by the phototransistors is linearly related to the inclination of the longitudinal axis. By linearly converting the difference in radiation to an output signal, an output signal linearly related to orientation may be produced. The technique by which the phototransistor output signals are converted to information relating to bubble orientation is discussed below in connection with FIGS. 5 and 7.

The arrangement of two LEDs as shown in FIG. 3 ensures that a shadow will be produced beneath the vial even when the bubble travels to one end of the vial. Other equivalent arrangements may also be used. For example, a single LED could be positioned to illuminate the upper side of the vial along an appreciable portion of its length. In another arrangement, a single LED and one or more mirrors could be used to direct radiation onto the vial at spaced apart positions, such as the positions defined by upper transverse passageways 56 and 57 of FIG. 3. For certain vials, a preferred arrangement might comprise three or more LEDs positioned along the length of the vial.

Still referring to FIGS. 1-4, LEDs 62 and 64 and the central longitudinal axis of vial 70 define a housing plane in which phototransistors 66 and 68 are preferably mounted. Vial assembly 26 is mounted in face plate 24 such that the housing plane is normal to the plane defined by longitudinal surfaces 13 and 14 of rail 12, and such that reference axis 18 lies in the housing plane. When the vial assembly is rotated such that the longitudinal axis of vial 70 is parallel to the reference axis, any inclination of longitudinal surfaces 13 and 14 with respect to the horizontal along the direction of reference axis 18 will cause vial 70 to be similarly inclined with respect to the horizontal, resulting in movement of bubble 74 along the longitudinal axis of the vial. If vial assembly 26 is rotated such that the longitudinal axis of the vial is inclined at a specific angle with respect to the reference axis, then the bubble will be centered in vial 70 only when the reference axis is inclined at such angle with respect to the horizontal and the housing plane is vertical. Level 10 can therefore be used to measure the orientation of nonhorizontal surfaces. Scale marks 38 on face plate 24, and complementary marks (not shown) on vial assembly 26, indicate the inclination of the vial assembly with respect to the reference axis, and can be used when the vial is horizontal read off the angle of a nonhorizontal surface.

Figure 6:
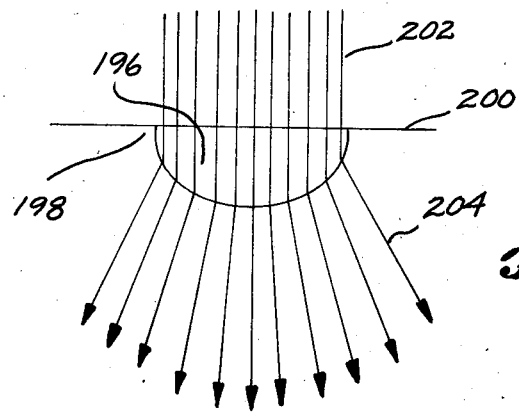
FIG. 6 is a ray diagram showing the dispersion and shadowing effect caused by an air bubble.

FIG. 5 illustrates a preferred embodiment of an electronic circuit for use with the level of FIGS. 1-4. The circuit of FIG. 5 is preferably mounted in instrument panel 20 behind face plate 24. The circuit includes LEDs 56 and 57 that are positioned in housing 40 as described above. LED 56 is connected in series with resistor 80 between the positive supply voltage $V_+$ and ground. The value of resistor 80 is selected to produce an appropriate light intensity from LED 56. In a similar manner, LED 57 is connected in series with resistor 82 between positive voltage supply $V_+$ and ground. The collector of phototransistor 58 is connected to positive voltage supply $V_+$ through resistor 84 and its emitter is connected through resistor 86 to ground. The collector of phototransistor 59 is also connected through resistor 84 to positive voltage supply $V_+$, and its emitter is connected through resistor 90 to ground. The output signals from phototransistors 58 and 59 are taken at their emitters at nodes 92 and 94, respectively. The values of resistors 84, 86 and 90 are preferably selected such that the phototransistors operate in linear portions of their ranges, such that the output signals at nodes 92 and 94 are linearly related to the intensity of radiation incident upon the respective phototransistors. The phototransistors and their associated resistors are also preferably selected such that when the intensity of radiation incident upon phototransistors 58 and 59 is equal, equal output signals are produced at nodes 92 and 94. A suitable component for phototransistors 58 and 59 is the FPT 100 phototransistor available from Fairchild. A suitable component for LEDs 56 and 57 is the XR-880 infrared LED available from Exar. A suitable value for resistors 84, 86 and 90 is 10K.

The signals at nodes 96 and 94 are input into a differential amplifier circuit comprising differential amplifier 100, input resistors 96 and 98, feedback resistors 102 and 104, output resistor 106 and capacitor 108. The output signal $V_A$ of the differential amplifier circuit is taken at node 110. The differential amplifier circuit is preferably constructed such that output signal $V_A$ is a linear function of the difference between the voltage signals at nodes 92 and 94. The signal at node 92 is coupled to the inverting input of differential amplifier 100 through input resistor 96, and the signal at node 94 is coupled to the noninverting input of differential amplifier 100 through input resistor 98. The noninverting input of the differential amplifier is coupled through feedback resistor 102 to the differential amplifier output at node 111, node 111 in turn being coupled through output resistor 106 to node 110. The noninverting input of differential amplifier 100 is coupled through feedback resistor 104 to node 112.

The ratio of the value of resistor 102 to the value of resistor 96 determines the gain applied to the signal at node 92, and the ratio of the value of resistor 104 to the value of resistor 98 determines the gain applied to the signal at node 94. These ratios are preferably chosen to be equal. Suitable values for these components are 1K for resistors 96 and 98, and 200K for resistors 102 and 104. A suitable component for differential amplifier 100 is the LF356N amplifier, available from National Semiconductor.

Node 112 is the center point of a voltage divider network that comprises resistors 114 through 119. The combined value of resistors 114 through 116 of this network is preferably chosen to be equal to the combined value of resistors 117 through 119. Under this circumstance, the voltage at node 112 is half the positive supply voltage $V_+$, and the steady state output signal $V_A$ is equal to half the supply voltage $V_+$ when the signals at nodes 92 and 94 are equal. Capacitor 108 and resistor 106 comprise a low-pass filter that prevents $V_A$ from changing too rapidly. Suitable values for these components are 0.1 microfarads and 220K, respectively.

Signal $V_A$ is input into voltage comparators 130-133 through input resistors 135-138, respectively. The other input for each comparator is provided by the voltage divider network. In particular, the negative input of comparator 130 is provided by $V_A$ through input resistor 135, and the positive input $V_1$ is provided by node 140 of the voltage divider network. The negative input of comparator 131 is provided by $V_A$ through input resistor 136, and the positive input $V_2$ is provided by node 142 of the voltage divider network. The positive input of comparator 132 is provided by $V_A$ through input resistor 137, and the negative input $V_3$ is provided by node 144 of the voltage divider network. Finally, the positive input of comparator 133 is provided by $V_A$ through input resistor 138, and the negative input $V_4$ is provided by node 146 of the voltage divider network.

The outputs of comparators 130-133 are connected to red LEDs 30-33 through resistors 150-153, respectively. The outputs of comparators 131 and 132 are also connected to AND gate 158. The output of AND gate 158, at node 160, is connected to the base of transistor 162, the collector of transistor 162 being connected to positive voltage supply $V_+$ through green LED 28 and resistor 164.

As previously described, the values of resistors 114 through 119 are preferably selected to produce a voltage at node 112 that is halfway between the positive supply voltage and ground. The values of resistors 114 through 119 are also preferably selected such that voltages $V_1$-$V_4$ are symmetrical about the voltage at node 112. In particular, suitable values for these resistors are:
R114—10K
R115—3.2K
R116—2K
R117—2K
R118—3.2K
R119—10K With such values, the voltage at node 112 will be halfway between voltages $V_2$ and $V_3$ and also halfway between voltages $V_1$ and $V_4$.

The operation of the circuit to this point will now be described. When the voltages at nodes 92 and 94 are equal, the output of the differential amplifier $V_A$ at node 110 will be equal to half the positive supply voltage. Since voltages $V_1$ and $V_2$ are both greater than half the positive supply voltage, the positive inputs of comparators 130 and 131 will be greater than the negative inputs to these comparators, and both comparators will therefore supply high output signals and red LEDs 30 and 31 will be off. Similarly, because voltages $V_3$ and $V_4$ are less than half the positive supply voltage, comparators 132 and 133 will also provide high output signals, and red LEDs 32 and 33 will be off. However, the high outputs of comparators 131 and 132 passing through AND gate 158 will cause the voltage at node 160 to be high, turning on transistor 162 and green LED 28. Therefore when green LED 28 is on, it indicates that the signals at nodes 90 and 92 are equal, that the radiation incident upon phototransistors 58 and 59 is equal, and that bubble 74 is centered along the longitudinal axis of vial 70.

When vial 70 is inclined in one direction, such that the central longitudinal axis of the vial is no longer horizontal, bubble 74 will move in one direction along the length of the vial, causing different amounts of radiation to reach phototransistors 58 and 59. The signals at nodes 92 and 94 will therefore be unequal, and the signal $V_A$ will swing either above or below one half the positive supply voltage, depending upon the direction of bubble movement. When $V_A$ rises a sufficient degree above the positive supply voltage, it exceeds $V_2$, causing the output of comparator 131 to go low. A low voltage from comparator 131 will turn on red LED 31, and will also disable AND gate 58, turning off green LED 28. If the device continues to tilt in the same direction, bubble 74 will continue to move towards one end of the vial, and $V_A$ will eventually exceed voltage $V_1$ as well as $V_2$. When $V_A$ exceeds $V_1$, red LED 30 will also turn on, indicating a greater deviation between the longitudinal axis of the vial and the horizontal.

The circuit operates in a similar manner when the via is inclined in the opposite direction. In such a case, $V_A$ will drop below one half the supply voltage and eventually fall to a value less than $V_3$. At such time, red LED 32 will turn on and green LED 28 will turn off. As $V_A$ continues to drop, it will eventually fall to a value less than $V_4$, at which point red LED 33 will also turn on. Red LEDs 30-33 therefore provide a convenient means for the user of the level to determine whether it is horizontal (or inclined at a specified angle) and, if not, the direction and degree of the deviation from the horizontal.

The device of the present invention derives its electrical power from a battery (not shown) mounted within instrument panel 20. Referring now to the right-hand portion of FIG. 5, the voltage $V_B$ provided by the battery, at node 172, is provided to momentary contact switch 36 and to the collector of transistor 174. As previously described, switch 36 is mounted in face plate 24 of instrument panel 20. When switch 36 is pushed, battery voltage $V_B$ is momentarily supplied to timer 176. Timer 176 responds by providing a high voltage to the base of transistor 174 for a predetermined period of time, preferably on the order of one minute. The high voltage provided to the base of transistor 174 turns the transistor on, thereby supplying a voltage at its emitter, at node 180, slightly less than $V_B$. The voltage at node 180 is the positive system supply voltage $V_+$, and is provided to all other system components, including timer 176. Timer 176 therefore operates essentially as a latch with a time out, such that whenever switch 36 is pushed, the timer will supply voltage $V_+$ through transistor 174 for the predetermined period of time.

Switch 36 is also connected to flip-flop 178, such that each time switch 36 is closed, the state of flip-flop 178 changes between first and second states. In its first state, flip-flop 178 provides a signal on line 182 that activates oscillator 186, and also provides a low signal on line 184 that turns on indicator LED 34 through resistor 188. Oscillator 186 responds to the actuation signal on line 182 by providing a periodic signal at a suitable frequency, such as two cycles per second, to AND gate 170. The other input to AND gate 170 is provided by the voltage at node 160. Therefore when the device of the present invention is level, such that the voltage at node 160 is high and green LED 28 is on, a signal provided by oscillator 186 will pass through AND gate 170 and resistor 192 to driver 190. Driver 190 in turn drives beeper 194 that is mounted within instrument housing 20. Therefore when flip-flop 178 is in its first state, the level will issue a series of beeps when the vial is horizontal, the frequency of beeps corresponding to the frequency of the signal provided by oscillator 186. Flip-flop 178 is designed such that it will enter its first state whenever positive supply voltage $V_+$ is initially provided.

If momentary contact switch 36 is depressed a second time before timer 176 times out, it will cause the timer to restart the timing interval, and also cause flip-flop 178 to enter its second state. In this state, oscillator 186 is deactivated, and LED 34 is turned off. Therefore, no pulses reach beeper 194 through AND gate 170. However, the voltage at node 160 is capacitatively coupled to driver 190 through a circuit comprising resistor 166 and capacitor 168. Therefore, whenever the voltage at node 160 changes from a low to a high state, a brief pulse will be coupled through capacitor 168 to driver 190 and beeper 174, causing the beeper to emit a short audible tone, indicating to the user that the vial has become horizontal. Depressing switch 36 an additional time before a time out occurs will cause flip-flop 178 to return to its first state, reenabling the periodic beeper.

Figure 7:
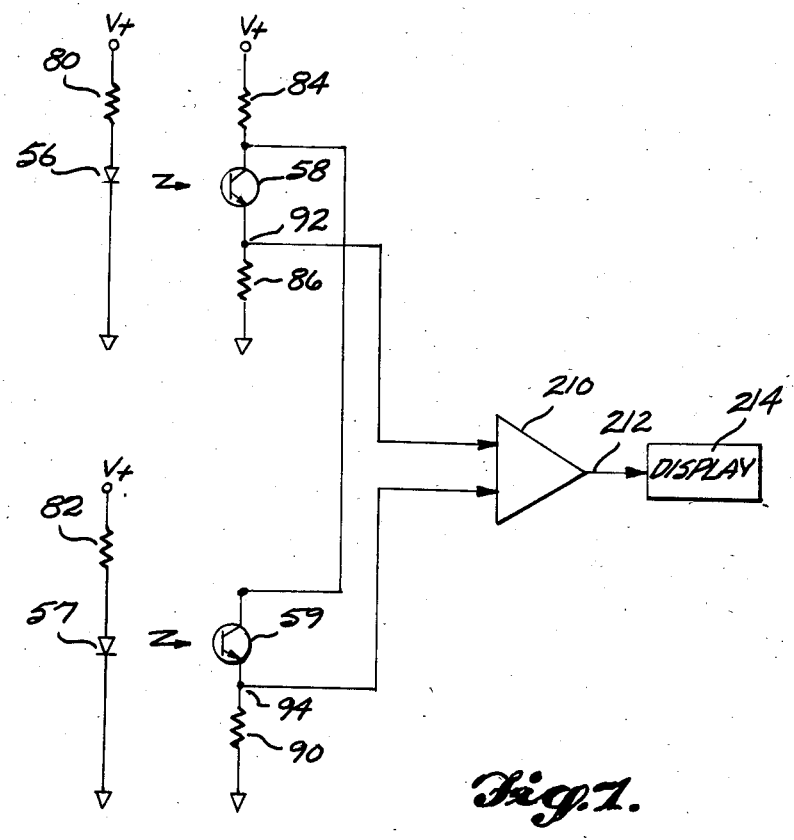
FIG. 7 is a block diagram of an alternate circuit for use in the present invention.

FIG. 7 illustrates a second preferred embodiment of the present invention. This embodiment makes use of a vial assembly 26 identical to that illustrated in FIGS. 2-4, and that includes LEDs 56 and 57 and phototransistors 58 and 59 as described above. The circuit of FIG. 7 also includes resistors 80, 82, 84, 86 and 90 identical to those described in connection with FIG. 5. In the FIG. 7 embodiment, the phototransistor output signals at nodes 92 and 94 are input into differential amplifier circuit 210, which responds by producing an output signal on line 212 that is a linear function of the difference between its input signals. The output signal on line 212 is input into a suitable display device 214. In one embodiment, display device 214 could comprise an analog meter together with an appropriate driver. In another embodiment, display device 214 could comprise an analog-to-digital converter together with a digital display and a display driver. In either case, display device 214 displays a value that is a linear function of the difference between the signals at nodes 92 and 94. As previously described, vial assembly 26 may be constructed such that the difference between the intensities of radiation at the phototransistors is a linear function of the inclination of the longitudinal axis of the vial with respect to horizontal. Therefore, so long as phototransistors 58 and 59 are operated in linear portions of their ranges, such that the outputs at nodes 92 and 94 are each linearly related to the intensity of incident radiation, the display produced by display device 214 will be linearly related to the angle of inclination of the longitudinal axis of the vial. Therefore, by appropriate calibration of the display device, the angle of inclination of the vial, and of the instrument in which it is mounted, may be displayed.

Figure 8:
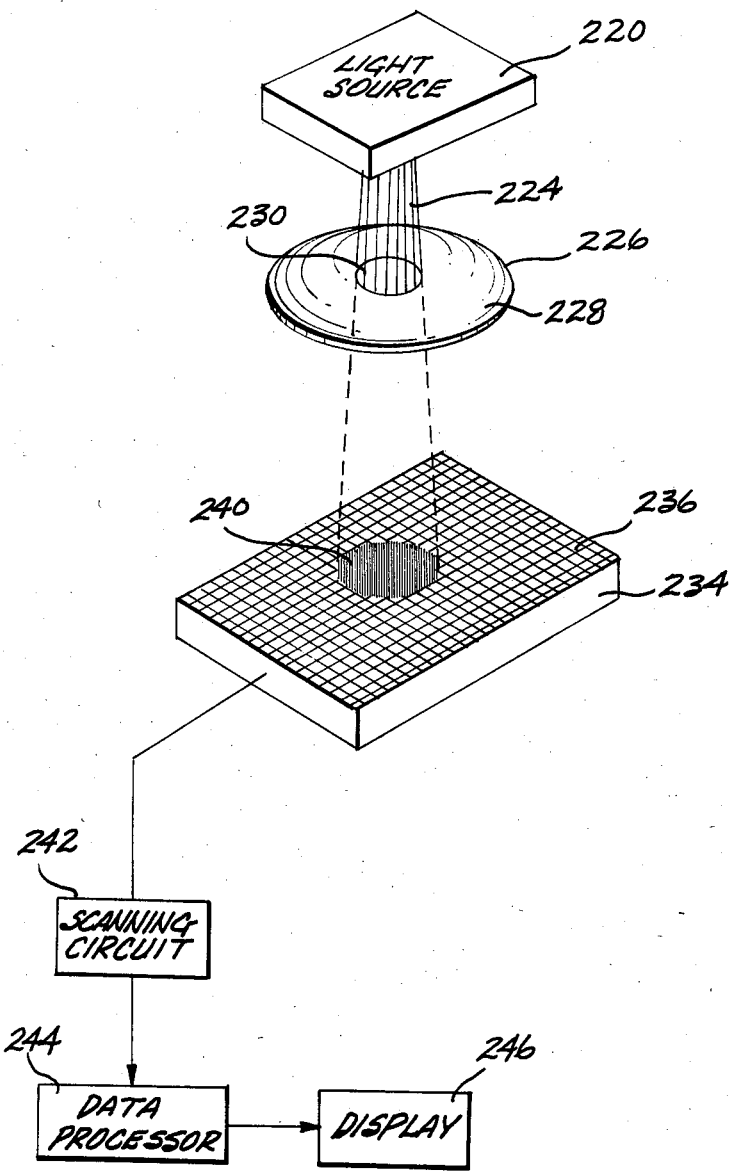
FIG. 8 is a schematic diagram of a two-dimensional inclination sensing device according to the present invention.

FIG. 8 illustrates a third preferred embodiment of the present invention in which the orientation of a selected plane with respect to the horizontal is sensed. The embodiment of FIG. 8 includes an appropriate light source 220, a bubble chamber 226, and sensor array 234 comprising a plurality of photosensitive elements 236. Light source 220, bubble chamber 226, and sensor array 234 are mounted in a suitable common housing (not shown). Bubble chamber 226 comprises a container that is partially filled with a liquid so as to form bubble 230, and that has an upper wall 228 that is concave when viewed from the interior of the chamber. The radius of curvature of upper wall 228 is substantially greater than the bubble diameter. Bubble chamber 226 is positioned between light source 220 and sensor array 234 such that upper wall 228 of the bubble chamber is approximately normal to the line between the light source and the sensor array. The plane normal to this line is defined to be the reference plane. Sensor array 234 is preferably parallel to the reference plane. Bubble 230 casts a shadow 240 on the sensor array whose position depends upon the position of bubble 230 and therefore upon the orientation of the reference plane with respect to the horizontal. The device of FIG. 8 also includes conventional means (not shown), functionally analogous to rail 12 of FIG. 1, for positioning the device with respect to a selected plane such that the orientation of the reference plane with respect to the selected plane is known.

The embodiment of FIG. 8 includes scanning circuit 242, data processor 244 and display device 246. Scanning circuit 242 continuously scans photosensitive elements 236, and digital signals representing the light intensity at each of such array elements are stored by data processor 244. The resulting values for the entire array are then processed in real time by the data processor to determine the position of the shadow. The shadow position is then used to determine the orientation of the reference plane with respect to the horizontal, and the resulting orientation values are displayed via display device 246.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A device capable of sensing information relating to the orientation of a selected direction with respect to the horizontal, comprising:
   a housing;
   a chamber mounted in the housing, the chamber including an upper wall and being partly filled with liquid so as to form a bubble in the chamber, the upper wall being shaped so as to permit the bubble to move with respect to the upper wall when the orientation of the upper wall with respect to the horizontal is changed;
   a source of electromagnetic radiation, the source of radiation being positioned on a first side of the chamber and being adapted to direct at least some of the radiation in a substantially vertical direction through a portion of the chamber containing the bubble to thereby form a shadow of the bubble on a second side of the chamber opposite to the first side;
   sensor means comprising at least two detectors positioned on the second side of the chamber, the sensor means being adapted to detect the shadow of the bubble caused by the radiation passing through the chamber and to produce an output signal having a characteristic from which the position of the bubble with respect to the upper wall may be determined over a range of positions that includes all positions between the first and second detectors; and
   positioning means for positioning the housing with respect to the selected direction such that the orientation of the upper wall with respect to the selected direction is known.

2. The device of claim 1, wherein the chamber comprises a vial elongated along a central longitudinal axis of the vial, and wherein the sensor means is adapted to produce an output signal having a characteristic related to the bubble position along the longitudinal axis.

3. The device of claim 2, wherein the source of radiation is positioned above the vial such that the source of radiation and the longitudinal axis define a housing plane, and wherein the detectors are located below the vial at spaced apart positions approximately in the housing plane.

4. The device of claim 3, wherein the sensor means comprises first and second detectors adapted to produce respective first and second signals corresponding to the intensity of the radiation at the respective detectors, wherein the sensor means further comprises difference means responsive to the first and second signals to produce the output signal, the output signal corresponding to the difference between the first and second signals, and wherein the device further comprises display means responsive to the output signal for indicating whether or not the longitudinal axis is horizontal.

5. The device of claim 1, wherein the upper wall is shaped so as to permit the bubble to move over a two-dimensional area of the upper wall when the orientation of the upper wall with respect to the horizontal is changed, wherein the sensor means comprises a two-dimensional array of detectors disposed substantially parallel to said area and adapted to produce output signals having characteristics related to the position of the bubble in said area, and wherein the positioning means is adapted to position the housing such that the orientation of said area with respect to a selected plane is known.

6. A device capable of sensing information relating to the orientation of a selected direction with respect to the horizontal, comprising:
   a housing;
   a vial mounted in the housing, the vial being elongated along a central longitudinal axis of the vial and partially filled with liquid so as to form a bubble in the vial;
   a source of electromagnetic radiation, the source of radiation being positioned on one side of the vial such that the source of radiation and the longitudinal axis define a housing plane and such that at least some of the radiation passes through the vial to thereby form a shadow of the bubble on the other side of the vial;
   sensor means comprising first and second detectors located at spaced apart positions approximately in the housing plane along the side of the vial opposite from the source of radiation, the sensor means being adapted to detect the shadow of the bubble caused by the radiation passing through the vial and to produce an output signal having a characteristic from which the position of the bubble along the longitudinal axis may be determined over a range of positions that includes all positions between the first and second detectors; and
   positioning means for positioning the housing will respect to the selected direction such that the housing plane is approximately vertical and the orientation of the longitudinal axis with respect to the selected direction is known.

7. The device of claim 6, wherein the first and second detectors are adapted to produce respective first and second signals corresponding to the intensity of the radiation at the respective detectors, and wherein the sensor means further comprises difference means responsive to the first and second signals to produce the output signal, the output signal corresponding to the difference between the first and second signals.

8. The device of claim 7, further comprising display means responsive to the output signal for indicating whether or not the longitudinal axis is horizontal.

9. The device of claim 8, wherein the vial is shaped such that when the longitudinal axis is approximately horizontal the bubble is symmetrical about a plane normal to the longitudinal axis, and wherein the display means includes means responsive to the output signal for indicating one of five states, the states comprising longitudinal axis horizontal, two degrees of deviation of the longitudinal axis from the horizontal in one direction, and two degrees of deviation of the longitudinal axis from the horizontal in the opposite direction.

10. The device of claim 9, wherein the vial is positioned with respect to the source of radiation such that when the longitudinal axis is approximately horizontal and the housing plane is approximately vertical, the source of radiation is positioned above the vial.

11. The device of claim 6, wherein the source of electromagnetic radiation comprises two light emitting diodes positioned at spaced apart locations along the longitudinal axis on said one side of the vial.

12. The device of claim 11, wherein each light emitting diode is directly across the vial in a transverse direction from one of the detectors.

13. The device of claim 12, wherein the vial has a generally circular cross section, and wherein the vial has a small curvature along its longitudinal axis.

14. The device of claim 11, wherein the light emitting surface of each light emitting diode abuts the vial, and wherein the center points of the light emitting surfaces of the light emitting diodes are spaced apart by a distance equal to the length of the bubble along the longitudinal axis when the longitudinal axis is approximately horizontal.

15. The device of claim 14, wherein the amount of liquid in the vial is selected such that when the longitudinal axis is approximately horizontal, the length of the bubble along the longitudinal axis is greater than one-third of the length of the vial.

16. The device of claim 7, wherein the output signal is linearly related to the bubble position along the longitudinal axis over a range of orientations of the longitudinal axis that includes horizontal.

17. The device of claim 7, wherein each detector comprises a phototransistor, and wherein the source of radiation and the sensor means are adapted such that each phototransistor operates in a linear portion of its range, such that the first and second signals are each linearly related to the intensity of radiation at the respective phototransistors.

18. The device of claim 17, wherein the difference means is linear, such that the output signal is a linear function of the difference between the first and second signals.

19. The device of claim 16, wherein the display means is adapted to provide a representation of the magnitude of the output signal, whereby the display means is operative to indicate the amount and direction of the deviation between the longitudinal axis and the horizontal.

20. The device of claim 6, wherein the positioning means is shaped so as to define a reference direction and is adapted for positioning the device such that the reference direction is aligned with the selected direction.

21. The device of claim 20, wherein the positioning means comprises mounting means for mounting the housing such that the longitudinal axis and the reference direction lie in a single plane.

22. The device of claim 21, wherein the positioning means comprises a planar elongated surface having an elongated dimension coincident with the reference direction, and wherein the mounting means mounts the housing such that the housing plane is normal to the elongated surface, whereby the reference direction lies in the housing plane and the housing plane is vertical when the elongated surface is horizontal.

23. The device of claim 22, wherein the mounting means is adapted to mount the housing such that the longitudinal axis is parallel to the reference direction.

24. The device of claim 22, wherein the mounting means includes means for mounting the housing for rotation about an axis normal to the housing plane, and indexing means for indicating the rotational position of the housing with respect to the mounting means.

25. A device capable of sensing information relating to the orientation of a selected plane with respect to the horizontal, comprising:

a housing;

a chamber mounted in the housing, the chamber including an upper wall that has a concave shape as viewed from the interior of the chamber, the chamber being partially filled with liquid so as to form a bubble in the chamber, the radius of curvature of the upper wall being substantially greater than the diameter of the bubble;

a source of electromagnetic radiation, the source of radiation being positioned outside the chamber along a chamber axis normal to the upper wall at an interior point thereof, the plane tangent to the upper wall at the interior point defining a reference plane, the source of radiation being adapted to direct at least some of the radiation through a portion of the chamber containing the bubble to thereby form a shadow of the bubble on the other side of the chamber;

sensor means for detecting the shadow of the bubble caused by the radiation passing through the chamber and for producing an output signal having a characteristic related to the bubble position in the reference plane, the sensor means comprising a two-dimensional array of detectors disposed substantially parallel to the reference plane on the side of the chamber opposite from the source of radiation; and positioning means for positioning the housing with respect to the selected plane such that the orientation of the reference plane with respect to the selected plane is known.

26. A circuit for comparing first and second input signals and producing a display indicative of the relative magnitudes of the input signals, the circuit comprising:

a differential amplifier for receiving the first and second input signals as inputs and for producing an output signal that is a function of the difference between the input signals;

a plurality of comparators, each comparator having first and second input terminals and an output terminal and being adapted to produce a comparison signal as its output terminal that is in a first state if the voltage level at the first input terminal is greater than the voltage level at the second input terminal and that is in a second state if the voltage level at the first input terminal is less than the voltage level at the second input terminal; and voltage source means for producing a plurality of different voltage signals that span a portion of the range within which the output signal of the differential amplifier may vary;

each comparator having one of its input terminals connected to receive the output signal from the differential amplifier and the other of its input terminals connected to receive one of said voltage signals, whereby connecting the output terminal of each comparator to a display device adapted to indicate the state of comparison signal provides a display indicative of the relative magnitudes of the input signals.

27. The circuit of claim 26, wherein the comparators comprise at least one first comparator having its first input terminal connected to receive one of said voltage signals and its second input terminal connected to receive the output signal from the differential amplifier, and at least one second comparator having its first input terminal connected to receive the output signal from the differential amplifier and its second input terminal connected to receive one of said voltage signals.

28. The circuit of claim 27, further comprising center display means adapted to produce a predetermined signal in response to one of the first comparators and one of the second comparators both having comparison signals in the first state.

29. The circuit of claim 26, wherein the differential amplifier comprises means for independently selecting the gain applied to each input signal, whereby the magnitude of the output signal of the differential amplifier can be selected for a given pair of input signals.

* * * * *

UNITED STATES PATENT AND TRADEMARK OFFICE
CERTIFICATE OF CORRECTION

PATENT NO. : 4,590,680

DATED : May 27, 1986

INVENTOR(S) : Hanchett et al.

It is certified that error appears in the above-identified patent and that said Letters Patent is hereby corrected as shown below:

In the drawings.

Sheet 2, Figure 5, reference numeral "56" should be — 62 —;
reference numeral "57" should be — 64 —;
reference numeral "58" should be — 66 —; and,
reference numeral "59" should be — 68 —.

Sheet 3, Figure 7, reference numeral "56" should be — 62 —;
reference numeral "57" should be — 64 —;
reference numeral "58" should be — 66 —; and,
reference numeral "59" should be — 68 —.

UNITED STATES PATENT AND TRADEMARK OFFICE
CERTIFICATE OF CORRECTION

PATENT NO. : 4,590,680

DATED : May 27, 1986

INVENTOR(S) : Hanchett et al.

It is certified that error appears in the above-identified patent and that said Letters Patent is hereby corrected as shown below:

| | |
|---|---|
| Column 5, | line 29, "purpoe" should be --purpose-- |
| Column 6, | line 45, Insert --to-- before "read" |
| | line 51, "56" should be --62-- |
| | line 51, "57" should be --64-- |
| | line 52, "56" should be --62-- |
| | line 55, "56" should be --62-- |
| | line 56, "57" should be --64-- |
| | line 58, "58" should be --66-- |
| | line 61, "59" should be --68-- |
| | line 64, "58" should be --66-- |
| | line 64, "59" should be --68-- |
| Column 7, | line 5, "58" should be --66-- |
| | line 5, "59" should be --68-- |
| | line 7, "58" should be --66-- |
| | line 7, "59" should be --68-- |
| | line 9, "56" should be --62-- |
| | line 9, "57" should be --64-- |
| | line 12, "96" should be --92-- |
| Column 8, | line 42, "90 and 92" should be --92 and 94-- |
| | line 43, "58" should be --66-- |
| | line 43, "59" should be --68-- |
| | line 50, "58" should be --66-- |

UNITED STATES PATENT AND TRADEMARK OFFICE
CERTIFICATE OF CORRECTION

PATENT NO. : 4,590,680

DATED : May 27, 1986

INVENTOR(S) : Hanchett et al.

It is certified that error appears in the above-identified patent and that said Letters Patent is hereby corrected as shown below:

Column 8, line 50, "59" should be --68--
line 58, "58" should be --158--
line 65, "via" should be --vial--
Column 9, line 45, "housing" should be --panel--
line 64, "174" should be --194--
Column 10, line 4, "56" should be --62--
line 4, "57" should be --64--
line 5, "58" should be --66--
line 5, "59" should be --68--
line 26, "58" should be --66--
line 26, "59" should be --68--
Column 11, line 51, Insert --being-- before "elongated"
Column 12, line 42, "will" should be --with--
Column 14, line 48, "as" should be --at--

Signed and Sealed this

Twenty-eighth Day of October, 1986

[SEAL]

*Attest:*

DONALD J. QUIGG

*Attesting Officer*   *Commissioner of Patents and Trademarks*